(12) United States Patent
Lahtinen et al.

(10) Patent No.: US 6,699,164 B1
(45) Date of Patent: Mar. 2, 2004

(54) METHOD FOR PROVIDING A ROLL FOR A PAPER MACHINE WITH SLIDING BEARINGS AND A ROLL FOR A PAPER MACHINE WITH SLIDING BEARINGS

(75) Inventors: Juha Lahtinen, Jyväskylä (FI); Ari Lehto, Leppävesi (FI); Jori Onnela, Jyväskylä (FI); Esa Lensu, Jyväskylä (FI); Pekka Kivioja, Muurame (FI); Aki Mikkola, Lappeenranta (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/913,678
(22) PCT Filed: Feb. 16, 2000
(86) PCT No.: PCT/FI00/00113
§ 371 (c)(1),
(2), (4) Date: Jan. 29, 2002
(87) PCT Pub. No.: WO00/49302
PCT Pub. Date: Aug. 24, 2000

(30) Foreign Application Priority Data

Feb. 17, 1999 (FI) .................................. 990329

(51) Int. Cl.[7] .............................................. B23P 15/00
(52) U.S. Cl. .............................. 492/10; 492/7; 492/16; 492/20
(58) Field of Search ................................ 492/7, 16, 20, 492/2, 10, 9; 162/199, 252, 263, 358.1; 137/557, 14; 100/47, 170

(56) References Cited

U.S. PATENT DOCUMENTS

| 3,747,181 | A | * | 7/1973 | Nykopp et al. ................. 492/5 |
| 5,060,357 | A | * | 10/1991 | Roerig et al. ................... 492/7 |
| 5,474,656 | A | * | 12/1995 | Brown et al. ................ 162/272 |
| 5,566,451 | A | * | 10/1996 | Niskanen et al. ........... 29/895.3 |
| 6,012,386 | A | * | 1/2000 | Lahtinen et al. ............... 100/47 |
| 6,109,285 | A | * | 8/2000 | Kivioja et al. ................. 137/14 |
| 6,135,935 | A | * | 10/2000 | Kivioja et al. ................. 492/20 |
| 6,471,006 | B2 | * | 10/2002 | Hulkkonen et al. ......... 184/6.21 |
| 6,543,937 | B1 | * | 4/2003 | Onnela ........................ 492/20 |

FOREIGN PATENT DOCUMENTS

| DE | 10100489 | * | 7/2001 |
| DE | 10118145 | * | 10/2001 |
| DE | 10124399 | * | 1/2002 |

* cited by examiner

Primary Examiner—I Cuda Rosenbaum
(74) Attorney, Agent, or Firm—Steinberg & Raskin, P.C.

(57) ABSTRACT

The invention relates to a method for providing a roll (1) for a paper machine with sliding bearings, the roll comprising a stationary roll axle (3) and a tubular roll mantle (2) arranged to revolve around it. In the method, the roll mantle (2) is supported on the roll axle (3) by means of hydraulic sliding bearing members (4a, 4b, 5a, 5b; 25, 28; 40a, 40b) which are arranged to accomplish radial fitting with bearings of the roll mantle in the loading direction and in the lateral direction with respect to it, and the axial fitting with bearings of the roll mantle. The sliding bearing members are loaded by means of a hydraulic medium, the feed of which to the sliding bearing members is controlled by means of control valves (6; 30; 40). In the method relating to the invention, when loading (F) is applied to the sliding bearing member (4a, 4b) effective in the loading direction, the loading force applied to the sliding bearing member (4a, 4b) subject to an external load due to the loading is compensated for automatically, essentially immediately, without an external control instruction, by means of the movement of the control valve (6) stem (60) of the sliding bearing member (4a, 4b) subject to loading, the said control valve (6) bringing about a rapid increase in the pressure of the hydraulic medium in the sliding bearing member (4a, 4b) subject to the external load, at the same time as the pressure of the medium supplied to the sliding bearing member (5a, 5b) located radially on the opposite side of the roll axle (3) in the loading direction is adjusted to a certain minimum value, whereby the bearings of the roll mantle are rendered so as to be essentially without stroke. The invention also relates to a roll for a paper machine which is provided with sliding bearings.

12 Claims, 3 Drawing Sheets

METHOD FOR PROVIDING A ROLL FOR A PAPER MACHINE WITH SLIDING BEARINGS AND A ROLL FOR A PAPER MACHINE WITH SLIDING BEARINGS

FIELD OF THE INVENTION

The present invention relates to a method for providing a roll for a paper machine with sliding bearings, the roll comprising a stationary roll axle and a tubular roll mantle arranged to revolve around it, to which roll is applied a radial external load in at least one direction, in which method the roll mantle is supported on the roll axle by means of hydraulic sliding bearing members which are arranged to accomplish radial fitting with bearings of the roll mantle in the loading direction and in the lateral direction with respect to it, and the axial fitting with bearings of the roll mantle, and which sliding bearing members are loaded by means of a hydraulic medium, the feed of which to the sliding bearing members is controlled by means of control valves.

BACKGROUND OF THE INVENTION

The Applicant's earlier U.S. Pat. No. 98,320 discloses a method for providing the roll mantle of a tubular roll intended for a paper machine or equivalent with sliding bearings, and a tubular roll that makes use of the method. In the solution according to the patent in question, the fitting with bearings corrects the position of the roll mantle in the perpendicular direction to the nip when it differs from the preset value. The said solution does not correct the position in the direction of the nip, but allows the mantle to be positioned in accordance with the position of the backing roll. In this solution, the roll mantle of the tubular roll is allowed to shift over a considerable distance in the main loading direction, giving as an example of the permitted movement of the mantle approximately 25 mm in both directions. In U.S. Pat. No. 98,320, the question is of so-called fitting with sliding bearings with stroke, which functions as such in many applications but, for example, in belt presses and in the calenders (Optiload™ calender) described in the Applicant's FI-patent no. 96334, this type of fitting with sliding bearings with stroke is not suitable. An important aim of the present invention is, therefore, to provide a method by means of which the fitting with sliding bearings of the roll mantle arranged to revolve around the stationary axle can be arranged in such a way that the mantle will remain in place with respect to the axle, allowing relatively high loads in the direction of the nip. Another aim of the invention is to provide a roll which is fitted with sliding bearings in such a way that the roll mantle will remain in place with respect to the axle, allowing relatively high loads in the direction of the nip. The roll is preferably a variable crown roll.

A further aim of the invention is to accomplish control of pressures in the sliding bearing members in such a way that, in the members, there will be a pressure corresponding to each loading situation respectively, so that the mantle is "expanded" as little as possible. In other words, the pressure opposite to loading should be allowed to increase, while the pressure parallel to the direction of loading should be as low as possible. A certain amount of pressure should, however, always be applied to the members so that the shoe will maintain light contact with the mantle and ensure sufficient lubrication. If the change caused by the movement of the control valve stem in the surface area of the feed opening of the hydraulic medium in the control valve is constant, the pressures will behave as shown in FIG. 1. In FIG. 1, reference mark A refers to the pressure prevailing in the sliding bearing member effective in the direction opposite to loading, reference mark B to the pressure prevailing in the sliding bearing member effective in the direction of loading, $F_L$ refers to the force generated by the bearings and $F_E$ to the force expanding the mantle. In accordance with FIG. 1, the force $F_E$ expanding the mantle is strong around the centre position of the stem. Should the expansion of the mantle not have to be considered, it would be advisable to realise the bearing in the manner shown in FIG. 1. The force amplification in the control system is greatest when the pressure changes under both bearing members, and not just under one bearing member.

To achieve the above aims, it is characteristic of the method relating to the invention that when the load is applied to a sliding bearing member effective in the loading direction, the loading force applied to the sliding bearing member subject to an external load due to the loading is compensated for automatically, essentially immediately, without an external control instruction, by means of the movement of the control valve stem of the sliding bearing member subject to loading, the said control valve bringing about a rapid increase in the pressure of the hydraulic medium in the sliding bearing member subject to the external load, at the same time as the pressure of the medium supplied to the sliding bearing member located radially on the opposite side of the roll axle in the loading direction is adjusted to a certain minimum value, whereby the bearings of the roll mantle are rendered so as to be essentially without stroke.

The roll relating to the invention is, on the other hand, characterised in that the arrangement comprises a control valve which compensates for the loading force applied to the bearing member located in the loading direction by an external load automatically, essentially immediately, controlled by the movement of the bearing member in question brought about by the loading, by bringing about a rapid increase in the pressure of the hydraulic medium in the sliding bearing member subject to the external load, at the same time as the pressure of the medium supplied to the sliding bearing member located radially on the opposite side of the roll axle in the loading direction is adjusted to a certain minimum value, and that the bearings of the roll mantle have been rendered so as to be essentially without stroke.

As concerns the control of pressures, the situation shown in FIG. 2 can be achieved by means of the solution relating to the invention, in which the force $F_E$ expanding the mantle can be maintained low, while obtaining a high bearing force $F_L$. The bearing force only needs to be adjusted by means of one bearing member (the bearing member opposite to the load) to prevent the deformation of the mantle.

BRIEF DESCRIPTION OF THE DRAWINGS

The invention is described in greater detail in the following, with reference to the appended drawings in which.

DETAILED DESCRIPTION OF THE INVENTION

Figure 1:
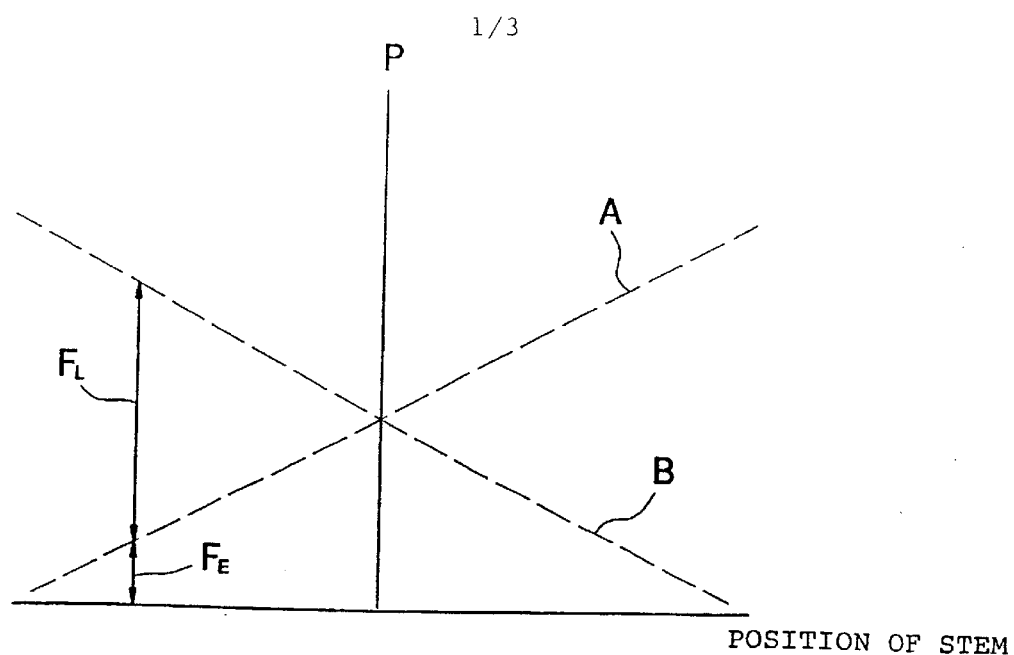
FIG. 1 shows diagrammatically the pressures acting on the sliding bearing members opposite and parallel to the loading direction, and their effect on the formation of the force expanding the mantle in a prior art solution.

FIG. 1 shows diagrammatically the pressures directed at the sliding bearing members A and B located radially in the loading direction on opposite sides of the roll axle as a function of the position of the stem Reference mark FE denotes the force expanding the mantle and reference mark FL the force produced by the bearings. This type of pressure behaviour takes place when the change in the surface area of the feed opening caused by the movement of the stem is constant and when a stem with minus coverage is used. According to the figure, the force expanding the mantle is strong, especially around the center position of the stem.

Figure 2:
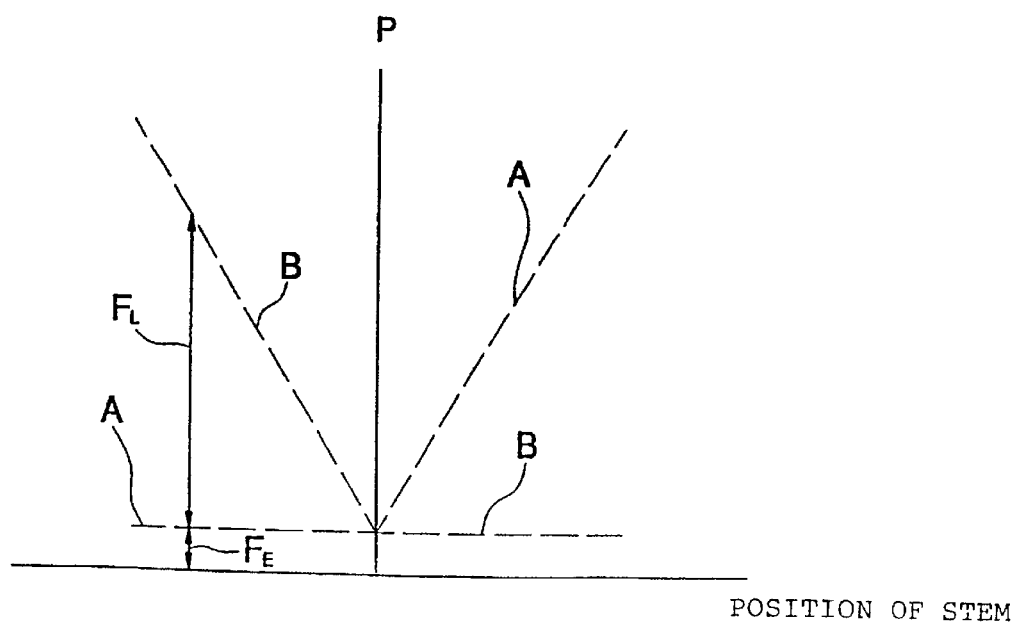
FIG. 2 shows, in the same manner as FIG. 1, the pressure behaviour of the sliding bearing members as achieved by the solution relating to the invention.

FIG. 2, on the other hand, shows in a corresponding manner the pressures directed at the sliding bearing members A and B located radially in the loading direction when applying the solution relating to the invention, in which case the change in the surface area of the feed opening caused by the movement of the stem consists of two parts. In this case, the force expanding the mantle can be kept at minimum, while on the other hand obtaining a high bearing force.

Figure 3:
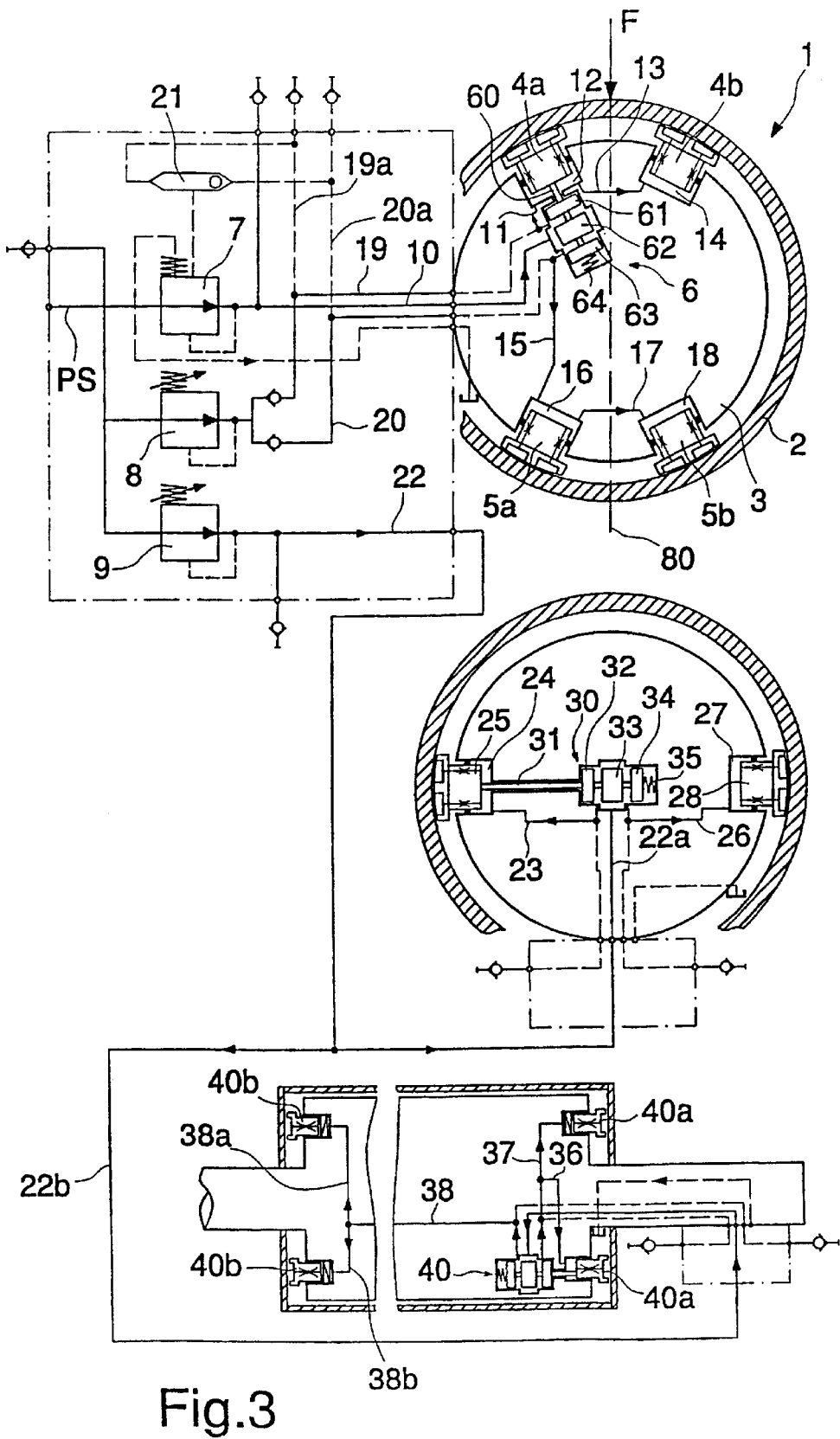
FIG. 3 shows diagrammatically an exemplifying embodiment of the fitting with sliding bearings relating to the invention.

FIG. 3 shows an embodiment of the roll provided with sliding bearings relating to the invention, in which uppermost are shown the loading bearings, in the centre the side bearings and lowest the axial bearings.

As shown in the top part of FIG. 3, the roll 1 comprises a stationary axle 3 and a roll mantle 2 arranged to revolve around it, the external loading applied to which is denoted by reference mark F. This loading F may be caused, for example, by the nip load. Reference mark 80 shows the plane of loading determined by the load. The bearings acting on the plane of loading include sliding bearing members 4a and 4b effective against the loading which, in the embodiment shown, are located symmetrically on opposite sides of the plane of loading 80, and sliding bearing members 5a and 5b effective in the loading direction, which are also located symmetrically on opposite sides of the plane 80 and radially on the opposite side of the roll axle 3 with respect to sliding bearing members 4a and 4b. The sliding bearing member 4a, 4b, 5a and 5b of the loading bearings is controlled by a joint control valve 6, an exemplifying embodiment of which is described in greater detail below in connection with FIG. 4.

FIG. 3 shows the loading bearings when formed of two sliding bearing members 4a and 4b which are placed at a distance from one another in the circumferential direction and located symmetrically with respect to the plane of loading 80 and effective in the opposite direction with respect to the loading, and correspondingly of two sliding bearing members 5a and 5b which are placed at a distance from one another in the circumferential direction and located symmetrically with respect to the plane of loading 80 and effective in the direction of loading, which members 5a and 5b are located radially on the opposite side of the roll axle with respect to sliding bearing members 4a and 4b, but obviously these could be realised, for example, as one sliding bearing member against loading and one sliding bearing member parallel to loading, respectively. There may also be more than two sliding bearing members in the circumferential direction, in the loading direction and in the direction opposite to loading, respectively, and in addition there may be one or more of them axially in succession at each point.

FIG. 3 also shows the hydraulics of the side bearings and axial bearings. Their operation corresponds to a great extent to that disclosed in the Applicant's earlier patent publication FI 98320, and thus they will only be described briefly below.

Figure 4:
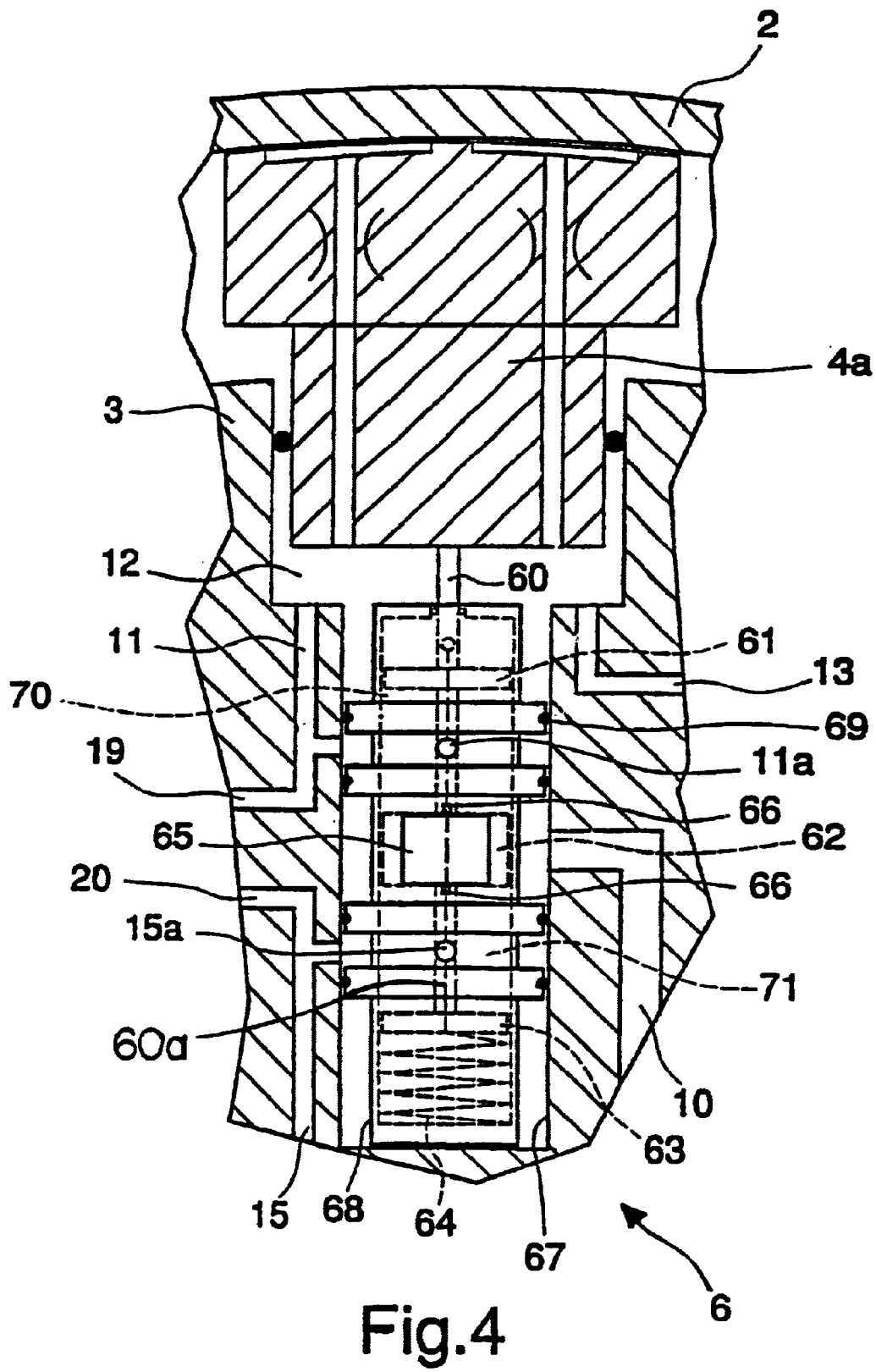
FIG. 4 shows in greater detail an embodiment of the control valve applied in the solution relating to the invention.

According to FIG. 4, the valve 6 comprises a valve bushing 68 located in a sealed manner with gaskets in a valve seat 67, inside which bushing is a stem 60 which is fixed mechanically to the sliding bearing member 4a. To the stem 60 is attached the end part 61 on the side of sliding bearing member 4a, and to the opposite end of the stem the other end part 63, and between them a centre part 62. Between end part 63 and the bottom of the seat 67 is a spring 64. Parts 61 -and 62 define between them a flow duct 70 via which, through opening 11 a, is supplied the hydraulic medium passed through the feed channel 10 and the feed opening 65 into the cavity space 12 of the hydraulic medium of the sliding bearing member 4a, and further along pipe 13 into the cavity space 14 below the sliding bearing member 14b (see FIG. 3), in which case the sliding bearing members 4a and 4b are mutually under the same pressure. Correspondingly, parts 62 and 63 define between them a flow duct 71 from which the hydraulic medium is passed through opening 15a and further along pipe 15 into the cavity space 16 of the hydraulic medium of the sliding bearing member 5a, and further along pipe 17 into the cavity space 18 of the sliding bearing member 5b (see FIG. 3), in which case the sliding bearing members 5a and 5b are mutually under the same pressure. The centre part 62 communicates with the feed opening 65 of the hydraulic medium. FIG. 4 further shows in broken line 60a a bore running through the central axis of -the stem, by means of which bore pressure forces ac ting on the ends of the slide are balanced.

According to FIG. 3, the supply PS of the hydraulic medium takes place via the compensator valve 7 and further along the feed pipe 10 to the control valve 6. There is feedback from the cavity space 12 of the sliding bearing member 4a along conduit 19 and 19a, and further via valve 21 to the compensator valve 7, and correspondingly from the cavity space 16 of the sliding bearing member 5a along conduit 15 and further via conduit 20 and 20a, likewise via valve 21 to the compensator valve 7. The purpose of the compensator valve 7 is to maintain the pressure difference between the pressure of the hydraulic medium supplied to the control valve 6 and the pressure prevailing in the cavity space 12, 14 of the sliding bearing member 4a, 4b effective against loading F constant. This pressure difference may be, for example, 10 bars, that is, if the pressure required in the sliding bearing member 4a, 4b effective against loading F is, for example, 50 bars, the pressure of the hydraulic medium supplied to the control valve must be 60 bars. By means of the sliding bearing members 5a, 5b effective in the direction of loading, the aim is to continuously maintain a certain minimum pressure, which may be, for example, of the order of 5 bars. For this purpose, the hydraulic system comprises a pressure reducing valve 8 which produces the said minimum pressure continuously, which means that should the pressure for some reason tend to fall below the said minimum value, for example, in the sliding bearing member 5a, 5b, the pressure reducing valve 8 will supply a pressure corresponding to the said minimum value along conduit 20 to the sliding bearing member in question. In the unloaded state of the roll, this certain minimum pressure for the sliding bearing member effective in the direction of loading is achieved by means of small additional openings 66 made at the axial ends of the feed opening 65 of the valve 6, whereby in the centre position of the stem 60, that is, when the centre part 62 covers the opening 65 substantially completely, but leaves the additional openings 66 free, a low pressure is able to pass to all sliding bearing members 4a, 4b, 5a and 5b through the additional openings 66 of the control valve 6. When the load F is applied to the mantle 2, the sliding bearing members 4a, 4b effective against the loading move a very short distance, whereby the stem 60 connected mechanically to member 4a moves correspondingly, causing the centre part 62 to shift downwards from the situation shown in FIG. 4, as a result of which the flow of hydraulic medium into conduit 19 increases (both via the main opening 65 and the additional opening 66) and that into conduit 20 decreases. By means of suitable dimensioning of the opening 65 and the additional opening 66 is accomplished a considerable boost in the effect of the valve already with a very small movement of, for example, less than 0.1 mm, which boost rapidly increases the pressure of the hydraulic medium in the cavity space 12 of the sliding bearing member 4a, thus compensating essentially immediately for the loading force applied to the sliding bearing member 4a by external loading, at the same time as a minor flow of hydraulic medium is supplied continuously via the lower additional opening 66 to the sliding bearing members 5a, 5b effective in the direction of loading.

The size of the additional opening 66 may be, for example, of the order of having a width of about 0.5× a length of about 0.32 mm, while the size of the main feed opening 65 is, for example, such that the width is about 7× a length of about 9 mm. In this case, for example, an axial movement of 0.1 mm by the stem increases the flow to approximately 14-fold. With greater boost is achieved lesser required axial movement. If the boost is, however, excessive, the valve seeks its correct position continuously, which makes it unstable.

A joint reduced feed pressure is taken for the side bearings and axial bearings through the pressure reducing valve 9 from the main supply line PS and passed along conduit 22 and further along conduit 22a to the side bearings and on the other hand along conduit 22b to the axle bearings. From conduit 22a the hydraulic medium is supplied to the control valve 30, which includes a stem 31 mechanically connected to the sliding bearing member 25, and three parts 32, 33, 34 attached to the stem, and a spring 35 acting on the end part 34. The valve 30 guides the feed pressure along conduit 23 to the cavity space 24 of sliding bearing member 25, and correspondingly along conduit 26 to the cavity space 27 of member 28. The control valve 30 adjusts the position of the sliding bearing members 25 and 28 automatically in such a way that the roll mantle 2 remains centred in the lateral direction with respect to the axle 3. The valve stem 31 seeks the centre position continuously, so that the same pressure is supplied to both sliding bearing members 25, 28.

For the axle bearings, the hydraulic medium is supplied along conduit 22b by the control valve, the structure of which corresponds to valve 30. Valve 40 guides the hydraulic medium along the conduit 36 and 37 to the sliding bearing members 40a at the other end, and correspondingly along conduits 38, 38a and 38b to the sliding bearing members 40b at the opposite end.

By means of the solution relating to the invention is accomplished fitting with sliding bearings without stroke of the roll, in which the roll mantle remains essentially in place with respect to the roll axle even under relatively heavy loading, which means that the roll is also suitable, for example, as a backing roll for a belt roll or as a calender roll, or generally as a backing roll for a site where high circumferential speed, vibrationless operation and a high load-carrying capacity are required of the roll.

According to the invention, it is conceivable to place also all other valves, in addition to the control valve 6, relating to the hydraulic system of the bearings, such as the compensator valve 7 and the pressure reducing valves 8 and 9 inside the roll, which will result in fast operating times.

What is claimed is:

1. A method for providing a roll (1) for a paper machine with sliding bearings, the roll comprising a stationary roll axle (3) and a tubular roll mantle (2) arranged to revolve around it, to which roll is applied a radial external load (F) in at least one direction, in which method the roll mantle (2) is supported on the roll axle (3) by means of hydraulic sliding bearing members (4a, 4b, 5a, 5b; 25, 28; 40a, 40b) which are arranged to accomplish radial fitting with bearings of the roll mantle in the loading direction and in the lateral direction with respect to it, and the axial fitting with bearings of the roll mantle, and which sliding bearing members are loaded by means of a hydraulic medium, the feed of which to the sliding bearing members is controlled by means of control valves (6; 30; 40), wherein when the load (F) is applied to the sliding bearing member (4a, 4b) effective in the loading direction, the loading force applied to the sliding bearing member (4a, 4b) subject to an external load due to the loading is compensated for automatically, without an external control instruction, by means of the movement of a stem (60) of a control valve (6) of the sliding bearing member (4a, 4b) subject to loading, the said control valve (6) bringing about a rapid increase in the pressure of the hydraulic medium in the sliding bearing member (4a, 4b), subject to the external load, at the same time as the pressure of the medium supplied to the sliding bearing member located radially on the opposite side of the roll axle (3) in the loading direction is adjusted to a certain minimum value, whereby the bearings of the roll mantle are rendered so as to be essentially without stroke.

2. A method as claimed in claim 1, wherein the stem (60) of the control valve (6) of the sliding bearing member (4a, 4b) subject to loading is connected mechanically to the sliding bearing member (4a) and is thus controlled directly by the movement of the sliding bearing member (4a).

3. A method as claimed in claim 1, wherein the stem (60) of the control valve (6) of the sliding bearing member (4a, 4b) subject to loading is controlled by an increase in the pressure of the hydraulic medium of the sliding bearing member (4a), which is due to the movement of the sliding bearing member (4a).

4. A method as claimed in claim 1, further comprising the steps of:

using a control valve (6) which has a feed opening (65, 66) which, in the unloaded state, permits a certain flow of a medium under relatively low pressure to the sliding bearing members (4a, 4b, 5a, 5b) effective in the direction of loading, radially on opposite sides of the roll axle;

bringing about a change in the surface area of the feed opening (65, 66) of the hydraulic medium, by movement of the stem (60) due to an external loading (F) applied to the mantle, so that with a slight movement of the stem is achieved a rapid change in surface area and thus a rapid increase in pressure in the sliding bearing member (4a, 4b) subject to external loading and effective in the opposite direction with respect to the loading; and permitting the valve (6) a certain flow of a medium under a lower pressure through the feed opening (66) to a sliding bearing member (5a, 5b) effective in the direction of loading, located radially on the opposite side of the roll axle.

5. A Method as claimed in claim 4, wherein should the pressure supplied via the control valve to the sliding bearing member (5a, 5b) effective in the direction of loading and located radially on the opposite side of the roll axle fall below a certain minimum value, a backup pressure corresponding to the said minimum value will be supplied to the sliding bearing member (5a, 5b) along a different route (19, 20).

6. A method as claimed in claim 1, wherein the said minimum value of the pressure supplied to the sliding bearing member (5a, 5b) is about 5 bars.

7. A method as claimed in claim 1, wherein the said slight movement permitted to the sliding bearing member due to external loading is less than about 0.1 mm.

8. A method as claimed in claim 1, wherein the feed pressure is supplied to the control valve (6) via the compensator valve (7) in such a way that the difference in the pressure of the hydraulic medium supplied to the feed opening (65, 66) of the control valve (6) with respect to the pressure prevailing in the cavity space of the sliding bearing member (4a, 4b) subject to loading remains at a certain constant value.

9. A roll for a paper machine provided with sliding bearings, the roll comprising a stationary roll axle (3) and a tubular roll mantle (2) arranged to revolve around it, to which roll is, during operation, intended to be applied a radial external load (F) in at least one direction, the said roll mantle (2) being supported on the roll axle by means of hydraulic sliding bearing members (4a, 4b, 5a, 5b; 25, 28; 40a, 40b) which are arranged to accomplish radial fitting with bearings of the roll mantle in the loading direction and in the lateral direction with respect to it, and the axial fitting with bearings of the roll mantle, and which sliding bearing members can be loaded by means of a hydraulic medium, the feed of which to the sliding bearing members can be controlled by means of control valves (6; 30; 40) connected to them, wherein the arrangement comprises a control valve (6) which compensates automatically for the loading force applied to the sliding bearing member (4a, 4b) subject to an external load due to the loading, controlled by the movement of the bearing member in question, essentially immediately, due to the said loading by bringing about a rapid increase in the pressure of the hydraulic medium in the sliding bearing member (4a, 4b) in question, at the same time as the pressure of the medium supplied to the sliding bearing member (5a, 5b) located radially on the opposite side of the roll axle (3) is adjusted to a certain minimum value, and that the bearings of the roll mantle are rendered so as to be essentially without stroke.

10. A roll as claimed in claim 9, wherein as a control valve (6) acts a valve bushing (68) located in a valve seat (67), inside which bushing is a stem (60) which comprises three parts (61, 62, 63) at an axial distance from one another, the parts forming flow ducts between each of them respectively, the flow channels communicating with the sliding bearing members, whereby the middlemost part communicates with the feed opening (65) of the hydraulic medium which extends through the wall of the bushing, in which feed opening (65) are formed small additional openings (66) in the axial end parts of the said feed opening, the additional openings permitting a certain flow of a medium under a relatively low pressure to sliding bearing members (4a, 4b, 5a, 5b) located radially on opposite sides of the roll axle in the direction of loading in the unloaded state of the roll, whereby the movement of the stem due to external loading away from position of equilibrium in the unloaded state brings about a rapid increase in the surface area of the feed opening, and thus an increase in pressure in the sliding bearing member (4a, 4b) subject to external loading and effective in the opposite direction with respect to the loading, permitting at the same time the said flow of the medium under a relatively low pressure to a sliding bearing member (5a, 5b) effective in the direction of loading and located radially on the opposite side of the roll axle.

11. A roll as claimed in claim 9, wherein the control valve (6) is connected mechanically to the sliding bearing member (4a) and is thus controlled directly by the movement of the sliding bearing member.

12. A roll as claimed in claim 9, wherein to the control valve (6) is connected a compensator valve (7) which maintains the difference in the pressure of the hydraulic medium supplied to the feed opening (65, 66) of the control valve (6) with respect to the pressure prevailing in the cavity space of the sliding bearing member (4a, 4b) subject to loading at a certain constant value.

\* \* \* \* \*